United States Patent
Feng et al.

(10) Patent No.: US 10,263,556 B2
(45) Date of Patent: Apr. 16, 2019

(54) METHOD AND SYSTEM FOR CORRECTING INITIAL ZERO OFFSET

(71) Applicant: CRRC ZHUZHOU INSTITUTE CO., LTD., Zhuzhou, Hunan (CN)

(72) Inventors: Jianghua Feng, Hunan (CN); Junfeng Xu, Hunan (CN); Yuliang Wen, Hunan (CN); Jing Shang, Hunan (CN); Jiade Huang, Hunan (CN); Xiaofan Zeng, Hunan (CN); Zhaoyang Zhang, Hunan (CN); Hanfeng Zheng, Hunan (CN); Xiong Liu, Hunan (CN); Yaping He, Hunan (CN)

(73) Assignee: CRRC ZHUZHOU INSTITUTE CO., LTD., Zhuzhou, Hunan (CN)

( * ) Notice: Subject to any disclaimer, the term of this patent is extended or adjusted under 35 U.S.C. 154(b) by 0 days.

(21) Appl. No.: 15/765,251

(22) PCT Filed: Jul. 22, 2016

(86) PCT No.: PCT/CN2016/091008
§ 371 (c)(1),
(2) Date: Mar. 31, 2018

(87) PCT Pub. No.: WO2017/059723
PCT Pub. Date: Apr. 13, 2017

(65) Prior Publication Data
US 2018/0302014 A1    Oct. 18, 2018

(30) Foreign Application Priority Data
Oct. 9, 2015    (CN) .......................... 2015 1 0648687

(51) Int. Cl.
*H02P 6/14*    (2016.01)
*H02P 21/32*    (2016.01)
(Continued)

(52) U.S. Cl.
CPC ............... *H02P 21/32* (2016.02); *H02P 6/08* (2013.01); *H02P 6/18* (2013.01); *H02P 21/18* (2016.02);
(Continued)

(58) Field of Classification Search
CPC ............................... H02P 21/32; H02P 21/18
(Continued)

(56) References Cited

U.S. PATENT DOCUMENTS

2014/0139154 A1*  5/2014  Chuang ............... H02K 19/103
                                                        318/400.02
2015/0100264 A1*  4/2015  Qian .................... G01D 5/2046
                                                        702/94

FOREIGN PATENT DOCUMENTS

CN    101257272 A    9/2008
CN    101615825 A    12/2009
(Continued)

OTHER PUBLICATIONS

International Search Report for PCT/CN2016/091008, dated Oct. 24, 2016, ISA/CN.

*Primary Examiner* — Erick Glass
(74) *Attorney, Agent, or Firm* — Apex Attorneys at Law, LLP; Yue (Robert) Xu

(57) ABSTRACT

A method and a system for correcting an initial zero position deviation are provided, which is applied to a permanent magnet synchronous motor and a resolver. The method includes: driving a rotor of the permanent magnet synchronous motor to rotate at a constant speed; acquiring counter electromotive forces of a stator of the permanent magnet synchronous motor and a position of a rotor of the resolver; calculating a space vector phase angle $\theta_1$ based on the counter electromotive forces; acquiring a rotation angle $\theta_2$ measured by the resolver; calculating an installation deviation $\Delta\theta$ corresponding to the space vector phase angle $\theta_1$ and
(Continued)

the rotation angle $\theta_2$; and adjusting a position of the resolver until the installation deviation $\Delta\theta$ meets a precision requirement.

10 Claims, 5 Drawing Sheets

(51) Int. Cl.
*H02P 6/08* (2016.01)
*H02P 6/18* (2016.01)
*H02P 21/18* (2016.01)

(52) U.S. Cl.
CPC ...... *H02P 2203/03* (2013.01); *H02P 2207/05* (2013.01)

(58) Field of Classification Search
USPC ....................................................... 318/400.2
See application file for complete search history.

(56) References Cited

FOREIGN PATENT DOCUMENTS

| | | | |
|---|---|---|---|
| CN | 102005995 | A | 4/2011 |
| CN | 102401626 | A | 4/2012 |
| CN | 102983803 | A | 3/2013 |
| CN | 103516167 | A | 1/2014 |
| CN | 103888040 | A | 6/2014 |
| CN | 204465405 | U | 7/2015 |
| CN | 105162372 | A | 12/2015 |
| JP | 2003006890 | A | 1/2003 |
| JP | 2014137248 | A | 7/2014 |

\* cited by examiner

METHOD AND SYSTEM FOR CORRECTING INITIAL ZERO OFFSET

The present application is the national phase of International Patent Application No. PCT/CN2016/091008 filed on Jul. 22, 2016, which claims priority to Chinese Patent Application No. 201510648687.4, titled "METHOD AND SYSTEM FOR CORRECTING INITIAL ZERO POSITION DEVIATION", filed on Oct. 9, 2015 with the State Intellectual Property Office of People's Republic of China, both of which are incorporated herein by reference in their entireties.

FIELD

The present disclosure relates to the technical field of a permanent magnet synchronous motor and a resolver, and in particular to a method and a system for correcting an initial zero position deviation.

BACKGROUND

In order to achieve a high-performance speed regulation of a permanent magnet synchronous motor, a resolver is required to accurately detect the position of a rotor of the permanent magnet synchronous motor. The accuracy of the detected position of the rotor of the permanent magnet synchronous motor is important for the performance of a motor control system, a fail of which may even cause an unstable operation of the motor speed regulation system. For convenient use in practices, in the installation of the resolver, it is required to ensure that an initial zero position of the motor is consistent with an initial zero position of the resolver, which is however difficult due to many factors.

The electrical principle of a brushless resolver is shown in FIG. 1. A primary excitation winding (R1-R2) of the resolver and orthogonal secondary induction windings (S1-S3, S2-S4) of the resolver are all located on a stator side. As shown in FIG. 1, no winding is arranged on the rotor of the variable reluctance resolver. Because of the special design of the rotor, a secondary coupling varies sinusoidally as an angle position varies. In a case where the rotor of the resolver rotates with the motor synchronously and an alternating-current excitation voltage is applied to the primary excitation winding, inductive potentials are generated in the two secondary output windings, with values of a product of a sine value of a rotation angle of the rotor and the excitation and a product of a cosine value of the rotation angle of the rotor and the excitation. Therefore, a rotor angle can be measured with the resolver. The input and outputs of the resolver have a relation as:

$$\begin{cases} E_{R1-R2} = E_0 \sin\omega t \\ E_{S1-S3} = KE_{R1-R2}\sin\theta \\ E_{S2-S4} = KE_{R1-R2}\cos\theta \end{cases} \quad (1)$$

where $E_0$ represents a maximum amplitude value of excitation, $\omega$ represents an excitation angular frequency, K represents a ratio of the resolver, and $\theta$ represents an axial angle by which the rotor rotates.

When a direct current is applied to a stator winding of the motor, a constant magnetic field is generated on the axis of the winding. Ideally, the constant magnetic field and the magnetic field of the permanent magnet rotor attract the rotor to a same position. In this case, an initial zero position of the permanent magnet rotor can be detected with the above method.

FIG. 2 is a schematic diagram of an initial positioning of a permanent magnet synchronous motor according to a conventional technology. As shown in FIG. 2, in an initial positioning of a resolver, generally, a direct current inflows from phase A (A1-A2), and outflows from phases B (B1-B2) and C (C1-C2). In this case a direction of a resultant magnetic field is an axis direction of phase A, i.e., a direction vertical to a horizontal line (defined as a zero position of the motor). Ideally, a constant stator magnetic field and a magnetic field of a permanent magnet rotor may attract the rotor to a same position, that is, the rotor of the motor is driven to and locked at the zero position of the motor, thereby correcting a deviation between the zero position of the resolver and the zero position of the motor. However, a friction resistance and a cogging torque always exist in the permanent magnet synchronous motor even if the motor is in an unloaded state. Therefore, in the initial positioning of the resolver, the rotor of the motor cannot be completely driven to and locked at the axis direction of phase A (i.e., the zero position of the motor), and thus an error angle $\Delta\theta$ exists in an initial orientation of the magnetic field of the rotor of the motor.

As can be seen, it is desired to solve by those skilled in the art the problem of how to correct the initial zero position deviation between permanent magnet synchronous motor and resolver.

SUMMARY

An objective of the present disclosure is to provide a method for correcting an initial zero position deviation, to correct an initial zero position deviation between a permanent magnet synchronous motor and a resolver.

In order to solve the above technical problem, a method for correcting an initial zero position deviation is provided according to the present disclosure. The method is applied to a permanent magnet synchronous motor and a resolver. The method includes:

driving a rotor of the permanent magnet synchronous motor to rotate at a constant speed;

acquiring counter electromotive forces of a stator of the permanent magnet synchronous motor and a position of a rotor of the resolver;

calculating a space vector phase angle $\theta_1$ corresponding to the counter electromotive forces of the stator of the permanent magnet synchronous motor based on the counter electromotive forces;

acquiring, based on the position of the rotor of the resolver, a rotation angle $\theta_2$ measured by the resolver;

calculating, based on a formula, an installation deviation $\Delta\theta$ corresponding to the space vector phase angle $\theta_1$ and the rotation angle $\theta_2$; and adjusting a position of the resolver until the installation deviation $\Delta\theta$ meets a precision requirement;

where the formula is $$\left|\theta_2 - \theta_1 - \frac{\pi}{2}\right|.$$

Preferably, the method includes: driving the rotor of the permanent magnet synchronous motor via a driver.

Preferably, the method includes: lighting an indicator lamp when the installation deviation $\Delta\theta$ meets the precision requirement, an indicator lamp is lit.

Preferably, the calculating a space vector phase angle $\theta_1$ corresponding to the counter electromotive forces of the stator of the permanent magnet synchronous motor based on the counter electromotive forces includes:

performing a coordinate transformation on the counter electromotive forces of the stator of the permanent magnet synchronous motor;

inputting a q-axis component obtained by the coordinate transformation to a PI regulator; and acquiring a sum of an output value of the PI regulator and an electrical angular velocity of the rotor of the permanent magnet synchronous motor, performing an integration on the sum, and performing a complementation on an integration result to obtain the space vector phase angle $\theta_1$.

Preferably, the position of the resolver may be adjusted manually until the installation deviation $\Delta\theta$ meets the precision requirement.

Preferably, the coordinate transformation is performed based on the following formula:

$$\begin{bmatrix} e_d \\ e_q \end{bmatrix} = k \begin{bmatrix} \cos\theta_1 & \frac{1}{2}\cos\theta_1 + \sqrt{\frac{3}{2}}\sin\theta_1 \\ -\sin\theta_1 & -\frac{1}{2}\sin\theta_1 + \sqrt{\frac{3}{2}}\cos\theta_1 \end{bmatrix} \begin{bmatrix} e_{ab} \\ e_{bc} \end{bmatrix}$$

where $e_q$ represents the q-axis component obtained by the coordinate transformation, k represents a constant, and $e_{ab}$ and $e_{bc}$ represent the counter electromotive forces of the stator of the permanent magnet synchronous motor.

A system for correcting an initial zero position deviation is provided according to the present disclosure. The system is applied to a permanent magnet synchronous motor and a resolver. The system includes:

a power device, configured to drive a rotor of the permanent magnet synchronous motor to rotate at a constant speed;

a signal acquisition device, configured to acquire counter electromotive forces of a stator of the permanent magnet synchronous motor and a rotation angle $\theta_2$ measured by the resolver;

a microprocessor, configured to calculate a space vector phase angle $\theta_1$ corresponding to the counter electromotive forces of the stator of the permanent magnet synchronous motor based on the counter electromotive forces, and calculate an installation deviation $\Delta\theta$ corresponding to the space vector phase angle $\theta_1$ and the rotation angle $\theta_2$ based on a formula; and a regulator, configured to adjust a position of the resolver until the installation deviation $\Delta\theta$ meets a precision requirement;

where the formula is $$\left| \theta_2 - \theta_1 - \frac{\pi}{2} \right|.$$

Preferably, the power device is a driver.

Preferably, the system further includes an indicator lamp. The indicator lamp is lit by the microprocessor when the installation deviation $\Delta\theta$ meets the precision requirement.

Preferably, the regulator is a manual regulator.

In the method for correcting the initial zero position deviation according to the present disclosure, the space vector phase angle $\theta_1$ corresponding to the counter electromotive forces is calculated based on the counter electromotive forces of the stator of the permanent magnet synchronous motor. The rotation angle $\theta_2$ measured by the resolver is acquired based on the position of the rotor of the resolver. The installation deviation $\Delta\theta$ of the resolver is calculated based on the formula. Finally, the position of the resolver is adjusted according to a precision requirement. With the method, the initial zero position deviation between the permanent magnet synchronous motor and the resolver can be corrected with simple operations.

DETAILED DESCRIPTION OF THE EMBODIMENTS

The technical solutions according to the embodiments of the present disclosure will be described below clearly and completely in conjunction with the drawings. Apparently, the described embodiments are only a few rather than all of the embodiments of the present disclosure. Based upon the embodiments of the present disclosure, any other embodiments obtained by those skilled in the art without any creative effort fall within the scope of the present disclosure.

The core of the present disclosure is to provide a method and a system for correcting an initial zero position deviation.

In order to make those skilled in the art better understand the technical solutions of the present disclosure, hereinafter, detail description is made in conjunction with the drawings and embodiments.

First Embodiment

Figure 3:
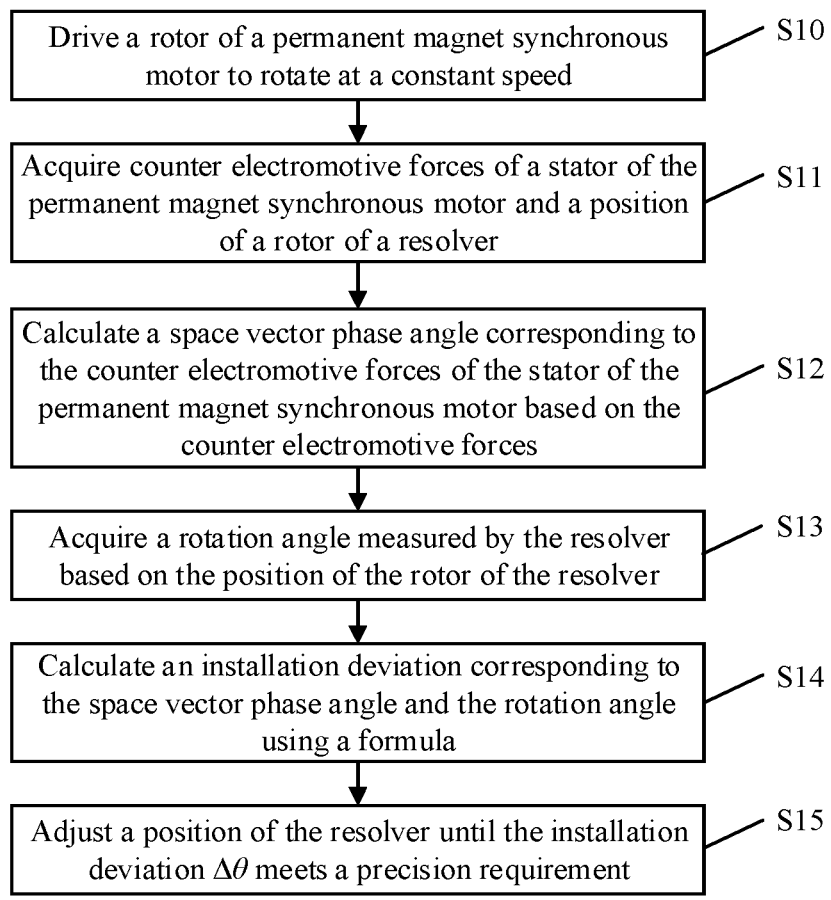
FIG. 3 is a flowchart of a method for correcting an initial zero position deviation according to the present disclosure.

FIG. 3 is a flowchart of a method for correcting an initial zero position deviation according to the present disclosure. As shown in FIG. 3, the method for correcting the initial zero position deviation is applied to a permanent magnet synchronous motor and a resolver. The method includes steps S10 to S15.

In step S10, a rotor of the permanent magnet synchronous motor is driven to rotate at a constant speed.

In step S11, counter electromotive forces of a stator of the permanent magnet synchronous motor and an angle of a rotor of the resolver are acquired;

In step S12, a space vector phase angle $\theta_1$ corresponding to the counter electromotive forces of the stator of the permanent magnet synchronous motor is calculated based on the counter electromotive forces.

In step S13, a rotation angle $\theta_2$ measured by the resolver is acquired based on the position of the rotor of the resolver.

In step S14, an installation deviation $\Delta\theta$ corresponding to the space vector phase angle $\theta_1$ and the rotation angle $\theta_2$ is calculated based on a formula.

In step S15, a position of the resolver is adjusted until the installation deviation $\Delta\theta$ meets a precision requirement.

The formula is $$|\theta_2 - \theta_1 - \frac{\pi}{2}|.$$

Figure 1:
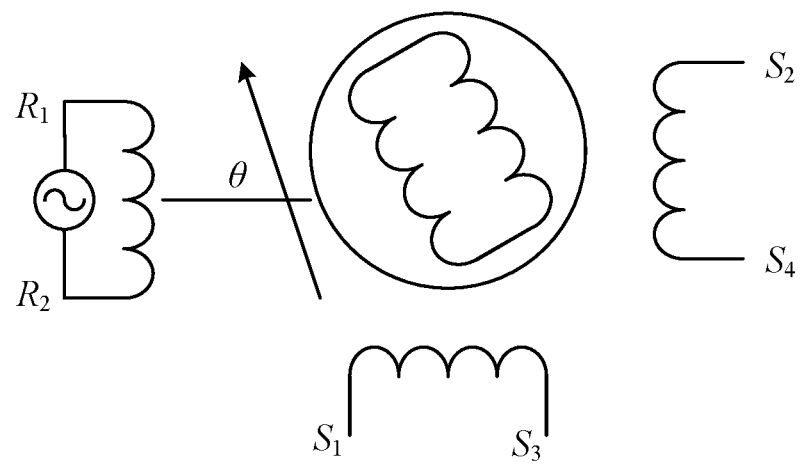
FIG. 1 is an electrical schematic diagram of a brushless resolver according to the conventional technology.
Figure 2:
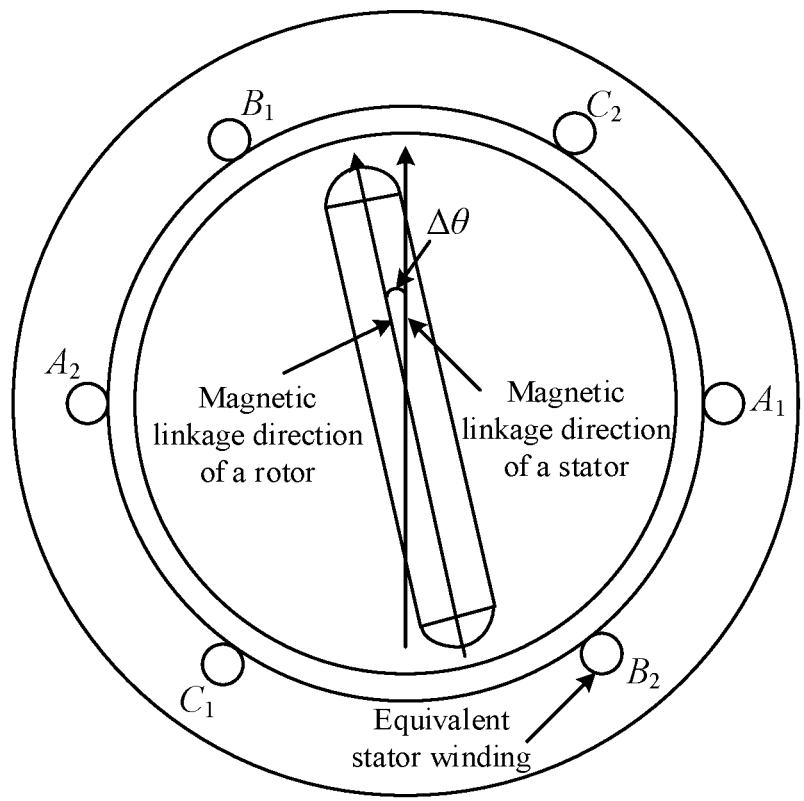
FIG. 2 is a schematic diagram of an initial positioning of a permanent magnet synchronous motor according to the conventional technology.

In an implementation, in a case where the rotor of the permanent magnet synchronous motor is driven by an external force to rotate at a certain speed, the stator of the permanent magnet synchronous motor may generate three phases of symmetrical counter electromotive forces by cutting a magnetic field, and a sine signal and a cosine signal orthogonal to each other are also generated on the resolver. As shown in FIG. 1, it is assumed that the rotor rotates counterclockwise and a positive direction of each of the counter electromotive forces is set as a direction from a port with a subscript of 1 to a port with a subscript of 2. A virtual counter electromotive force space vector rotates counterclockwise and the position thereof coincides with that of the rotor. In a case where one of the three phases of counter electromotive forces reaches a maximum value, the rotor is perpendicular to an axis of this phase. If the phase angle of the counter electromotive force and the angle measured by the resolver at a certain time instant are known, then the installation deviation of the resolver is known.

Therefore, according to the present disclosure, the counter electromotive forces of the stator of the permanent magnet synchronous motor and the angle of the rotor of the resolver are acquired firstly. Next, the space vector phase angle $\theta_1$ corresponding to the counter electromotive forces of the stator of the permanent magnet synchronous motor is calculated based on the counter electromotive forces. Then, the rotation angle $\theta_2$ measured by the resolver is acquired. The installation deviation $\Delta\theta$ corresponding to the space vector phase angle $\theta_1$ and the rotation angle $\theta_2$ is calculated based on the formula $$|\theta_2 - \theta_1 - \frac{\pi}{2}|.$$

Precision requirements on the installation deviation of the resolver are different depending on different scenarios. Therefore, after the installation deviation $\Delta\theta$ of the resolver is acquired, the position of the resolver is adjusted according to the precision requirement until the installation deviation $\Delta\theta$ meets the precision requirement.

In the method for correcting the initial zero position deviation according to the present disclosure, the space vector phase angle $\theta_1$ corresponding to the counter electromotive forces is calculated based on the counter electromotive forces of the stator of the permanent magnet synchronous motor. The rotation angle $\theta_2$ measured by the resolver is acquired based on the position of the rotor of the resolver. The installation deviation $\Delta\theta$ of the resolver is calculated based on the formula. Finally, the position of the resolver is adjusted according to a precision requirement. With the method, the initial zero position deviation between the permanent magnet synchronous motor and the resolver can be corrected with simple operations.

It should be noted that, in a case where a complementation is performed on a first angle of $\theta_1$ and $\theta_2$ which exceeds $2\pi$, $2\pi$ is subtracted from the other angle, thereby obtaining the installation deviation $$\Delta\theta = |\theta_2 - \theta_1 - \frac{\pi}{2}|.$$

In step S10, the rotor of the permanent magnet synchronous motor may be driven by a driver.

Preferably, after step S15, an indicator lamp may be lit to promote an operator that the current position meets the precision requirement.

By lighting the indicator lamp, the operator can be promoted timely that the current position meets the precision requirement, thereby saving the correcting time and improving the efficiency.

As a preferred embodiment, step S12 of calculating the space vector phase angle $\theta_1$ corresponding to the counter electromotive forces of the stator of the permanent magnet synchronous motor based on the counter electromotive forces and the angle of the rotor of the resolver includes:

performing a coordinate transformation on the counter electromotive forces of the stator of the permanent magnet synchronous motor;

inputting a q-axis component obtained by the coordinate transformation to a PI regulator; and acquiring a sum of an output value of the PI regulator and an electrical angular velocity of the rotor of the permanent magnet synchronous motor, performing an integration on the sum, and performing a complementation on an integration result to obtain the space vector phase angle $\theta_1$.

Figure 4:
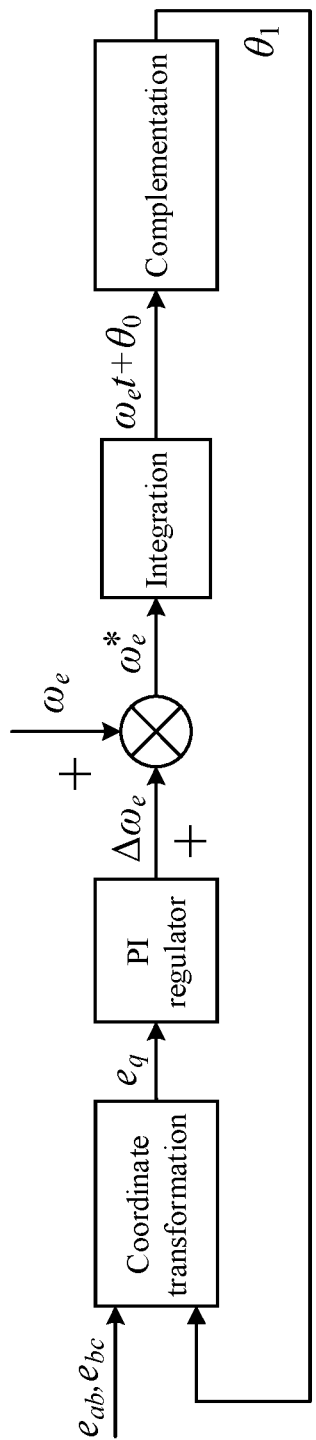
FIG. 4 is a schematic block diagram of a calculation of a space vector phase angle according to the present disclosure.

In order that those skilled in the art better understand the calculation of the space vector phase angle $\theta_1$ according to the present disclosure, reference is made to FIG. 4, which is a schematic block diagram of a calculation of a space vector phase angle according to the present disclosure.

A coordinate transformation is performed on the counter electromotive forces $e_{ab}$ and $e_{bc}$ of the stator of the permanent magnet synchronous motor using the following formula:

$$\begin{bmatrix} e_d \\ e_q \end{bmatrix} = k \begin{bmatrix} \cos\theta_1 & \frac{1}{2}\cos\theta_1 + \sqrt{\frac{3}{2}}\sin\theta_1 \\ -\sin\theta_1 & -\frac{1}{2}\sin\theta_1 + \sqrt{\frac{3}{2}}\cos\theta_1 \end{bmatrix} \begin{bmatrix} e_{ab} \\ e_{bc} \end{bmatrix} \quad (2)$$

where $e_q$ represents a q-axis (quadrature axis) component obtained by the coordinate transformation, k represents a constant generally having a value of ⅔ or $\sqrt{2/3}$, and $e_{ab}$ and $e_{bc}$ represent the counter electromotive forces of the stator of the permanent magnet synchronous motor.

By calculating with the above coordinate transformation formula, a d-axis component and the q-axis component are acquired. The q-axis component $e_q$ is inputted to a PI regulator. An estimated electrical angular velocity $\omega_e^*$ is obtained by acquiring a sum of an output value $\Delta\omega_e$ of the PI regulator and an electrical angular velocity $\omega_e$ of the rotor of the permanent magnet synchronous motor. Then, $\omega_e t + \theta_0$ is obtained by performing an integration. Finally, the space vector phase angle $\theta_1$ is acquired by a complementation. $\theta_0$ is an initial value.

It should be noted that the PI regulator in the present disclosure may be a proportional integral regulator. Besides, since FIG. 4 shows a discrete control process, the initial value $\theta_0$ may be given arbitrarily.

In step S15, the position of the resolver may be adjusted manually until the installation deviation $\Delta\theta$ meets the precision requirement.

Second Embodiment

Figure 5:
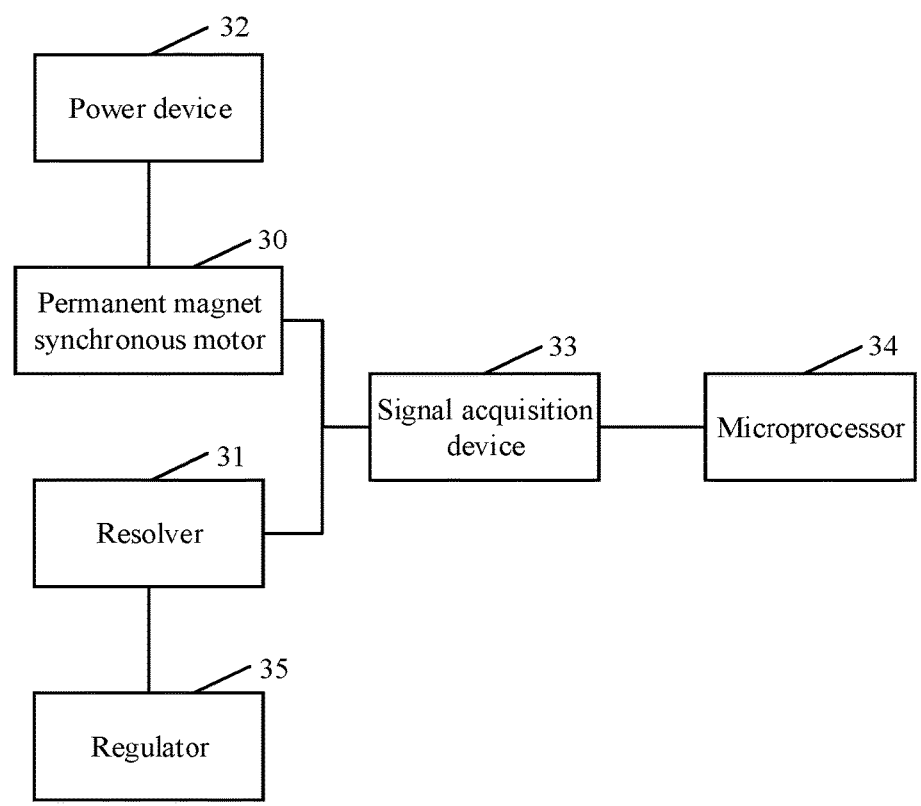
FIG. 5 is a structural diagram of a system for correcting an initial zero position deviation according to the present disclosure.

FIG. 5 is a structural diagram of a system for correcting an initial zero position deviation according to the present disclosure. The system for correcting the initial zero position deviation is applied to a permanent magnet synchronous motor 30 and a resolver 31. The system includes a power device 32, a signal acquisition device 33, a microprocessor 34 and a regulator 35.

The power device 32 is configured to drive a rotor of the permanent magnet synchronous motor 30 to rotate at a constant speed.

The signal acquisition device 33 is configured to acquire counter electromotive forces of a stator of the permanent magnet synchronous motor and a rotation angle $\theta_2$ measured by the resolver 31.

The microprocessor 34 is configured to calculate a space vector phase angle $\theta_1$ corresponding to the counter electromotive forces of the stator of the permanent magnet synchronous motor 30 based on the counter electromotive forces, and calculate an installation deviation $\Delta\theta$ corresponding to the space vector phase angle $\theta_1$ and the rotation angle $\theta_2$ based on a formula.

The regulator 35 is configured to adjust a position of the resolver 31 until the installation deviation $\Delta\theta$ meets a precision requirement.

The formula is $$|\theta_2 - \theta_1 - \frac{\pi}{2}|.$$

It should be noted that, for facilitating a check on a precision of the installation, a precision selection button may be arranged on the microprocessor to select a level of the precision, and the level may be set based on the practical situation.

In the system for correcting the initial zero position deviation, the microprocessor calculates the space vector phase angle $\theta_1$ corresponding to the counter electromotive forces of the stator of the permanent magnet synchronous motor based on the counter electromotive forces. The rotation angle $\theta_2$ measured by the resolver is acquired based on the position of the rotor of the resolver. The installation deviation $\Delta\theta$ of the resolver is calculated based on the formula. Finally, the position of the resolver is adjusted according to the precision requirement. With the system, the initial zero position deviation between the permanent magnet synchronous motor and the resolver can be corrected with simple operations.

The power device may be a driver.

The system for correcting the initial zero position deviation may further include an indicator lamp. When the installation deviation $\Delta\theta$ meets the precision requirement, the indicator lamp is lit by the microprocessor.

The regulator may be a manual regulator.

Since the system according to the second embodiment corresponds to the method according to the first embodiment, one may refer to the first embodiment for details of the system, which is not repeated hereinafter.

In the above, the method and system for correcting an initial zero position deviation according to the present disclosure are described in detail. Specific examples are described herein to set forth the principle and embodiments of the present disclosure, and the above embodiments are illustrated only for better understanding of the method and the core concept of the present disclosure. It should be noted that, various modifications and changes may be made to the present disclosure by those skilled in the art without departing from the spirit of the present disclosure, and these modifications and changes fall within the protection scope of the appended claims.

The invention claimed is:

1. A method for correcting an initial zero position deviation, applied to a permanent magnet synchronous motor and a resolver, comprising:
    driving a rotor of the permanent magnet synchronous motor to rotate at a constant speed;
    acquiring counter electromotive forces of a stator of the permanent magnet synchronous motor and a position of a rotor of the resolver;
    calculating a space vector phase angle $\theta_1$ corresponding to the counter electromotive forces of the stator of the permanent magnet synchronous motor based on the counter electromotive forces;
    acquiring, based on the position of the rotor of the resolver, a rotation angle $\theta_2$ measured by the resolver;
    calculating, based on a formula, an installation deviation $\Delta\theta$ corresponding to the space vector phase angle $\theta_1$ and the rotation angle $\theta_2$; and
    adjusting a position of the resolver until the installation deviation $\Delta\theta$ meets a precision requirement;
    wherein the formula is $$|\theta_2 - \theta_1 - \frac{\pi}{2}|.$$

2. The method for correcting the initial zero position deviation according to claim 1, comprising:
    driving the rotor of the permanent magnet synchronous motor via a driver.

3. The method for correcting the initial zero position deviation according to claim 1, further comprising:
    lighting an indicator lamp when the installation deviation $\Delta\theta$ meets the precision requirement.

4. The method for correcting the initial zero position deviation according to claim 1, wherein, the calculating a space vector phase angle $\theta_1$ corresponding to the counter electromotive forces of the stator of the permanent magnet synchronous motor based on the counter electromotive forces comprises:
    performing a coordinate transformation on the counter electromotive forces of the stator of the permanent magnet synchronous motor;
    inputting a q-axis component obtained by the coordinate transformation to a PI regulator; and
    acquiring a sum of an output value of the PI regulator and an electrical angular velocity of the rotor of the permanent magnet synchronous motor, performing an integration on the sum, and performing a complementation on an integration result to obtain the space vector phase angle $\theta_1$.

5. The method for correcting the initial zero position deviation according to claim 1, wherein the position of the resolver is adjusted manually until the installation deviation $\Delta\theta$ meets the precision requirement.

6. The method for correcting the initial zero position deviation according to claim 4, wherein the coordinate transformation is performed based on the following formula:

$$\begin{bmatrix} e_d \\ e_q \end{bmatrix} = k \begin{bmatrix} \cos\theta_1 & \frac{1}{2}\cos\theta_1 + \sqrt{\frac{3}{2}}\sin\theta_1 \\ -\sin\theta_1 & -\frac{1}{2}\sin\theta_1 + \sqrt{\frac{3}{2}}\cos\theta_1 \end{bmatrix} \begin{bmatrix} e_{ab} \\ e_{bc} \end{bmatrix}$$

where $e_q$ represents the q-axis component obtained by the coordinate transformation, k represents a constant, and $e_{ab}$ and $e_{bc}$ represent the counter electromotive forces of the stator of the permanent magnet synchronous motor.

7. A system for correcting an initial zero position deviation, applied to a permanent magnet synchronous motor and a resolver, comprising:

a power device, configured to drive a rotor of the permanent magnet synchronous motor to rotate at a constant speed;

a signal acquisition device, configured to acquire counter electromotive forces of a stator of the permanent magnet synchronous motor and a rotation angle $\theta_2$ measured by the resolver;

a microprocessor, configured to calculate a space vector phase angle $\theta_1$ corresponding to the counter electromotive forces of the stator of the permanent magnet synchronous motor based on the counter electromotive forces, and calculate an installation deviation $\Delta\theta$ corresponding to the space vector phase angle $\theta_1$ and the rotation angle $\theta_2$ based on a formula; and a regulator, configured to adjust a position of the resolver until the installation deviation $\Delta\theta$ meets a precision requirement;

wherein, the formula is $$\left|\theta_2 - \theta_1 - \frac{\pi}{2}\right|.$$

8. The system for correcting the initial zero position deviation according to claim 7, wherein the power device is a driver.

9. The system for correcting the initial zero position deviation according to claim 7, further comprising an indicator lamp, wherein the indicator lamp is lit by the microprocessor when the installation deviation $\Delta\theta$ meets the precision requirement.

10. The system for correcting the initial zero position deviation according to claim 7, wherein the regulator is a manual regulator.

* * * * *